United States Patent [19]

Eccleston

[11] Patent Number: 4,828,647

[45] Date of Patent: May 9, 1989

[54] DRY WALL TAPER

[75] Inventor: Charles E. Eccleston, Newark, Calif.

[73] Assignee: Premier Drywall Tool Co., Belmont, Calif.

[21] Appl. No.: 166,666

[22] Filed: Mar. 11, 1988

[51] Int. Cl.[4] .................... B32B 31/12

[52] U.S. Cl. .................... 156/526; 156/574; 156/575; 156/577; 156/578; 156/579

[58] Field of Search .................... 156/516, 522, 526, 529, 156/533, 534, 574, 575, 577, 578, 579

[56] References Cited

U.S. PATENT DOCUMENTS

| | | | |
|---|---|---|---|
| 971,133 | 9/1910 | Maynes | 156/526 |
| 1,346,647 | 7/1920 | Germaszewski | 156/575 |
| 1,412,402 | 4/1922 | Grigas | 156/526 |
| 2,815,142 | 12/1957 | Ames | 156/575 |
| 2,860,803 | 11/1958 | Fleming | 156/575 |
| 3,260,638 | 7/1966 | Hoveland | 156/575 |
| 4,086,121 | 4/1978 | Ames | 156/575 |

*Primary Examiner*—Caleb Weston
*Attorney, Agent, or Firm*—Edward B. Gregg

[57] ABSTRACT

Apparatus for applying tape and mastic to joints between prefabricated wall sections such as gypsum board comprising a tubular housing which holds a supply of mastic, a main drive roller mounted at the forward end of the housing which rotates by friction as it is moved along a wall and tape drive roller means operated by the main drive roller and which feeds the tape forwardly.

2 Claims, 2 Drawing Sheets

DRY WALL TAPER

This invention relates to apparatus for applying tape to the joints between sections of prefabricated wall sections such as plaster board and gypsum board.

In Ames U.S. Pat. No. 4,086,121 and Ames U.S. Pat. No. 2,815,142 apparatus is described for accomplishing such taping. Such apparatus comprises a cylindrical casing which holds a supply of mastic, or "mud" as it is commonly called, which is extruded into a joint between sections of wall board and serves also as an adhesive to adhere tape to the wall. The apparatus also supplies the tape continuously during application of mastic thereby resulting in a joint between wall sections filled with the mastic and overlying which is a tape. The apparatus also comprises a tape supply means to feed the tape as the apparatus is moved along a joint. Means are also provided to cut the tape at the end of a run.

The tape feed of the aforesaid apparatus includes a pin which penetrates the tape and, as the pin is moved forwardly by movement of a sleeve, the tape is moved forwardly. Then the sleeve is moved backwardly, which acts to remove the pin from the tape. The tape is then advanced by friction wheels which move along the wall.

When a tape has been applied in this manner, the aforesaid sleeve is moved further in a rearward direction to actuate a cutter which cuts the tape.

It will be apparent that several movements of the sleeve are required, one in a forward direction to feed the tape to a point where it is confined between tape drive wheels and the wall, then rearwardly to disengage the pin from the tape, and then further rearwardly to actuate the tape cutter. Also at the end of a taping stroke after the tape is cut, the sleeve is again moved forward to advance the tape for a new run but with no mastic consistently applied to the tape. This requires severing this segment of tape.

It is an object of the present invention to provide improvements upon the aforesaid taping apparatus.

It is a particular object of the invention to provide a taping apparatus of the general character described above which simplifies the operation and avoids the need to manually advance the tape (with or without mastic) but does so automatically with mastic upon completing an application of tape to a wall or ceiling and after cutting the tape.

The above and other objects of the invention will be apparent from the ensuing description and the appended claims.

One embodiment of the invention is shown in the accompanying drawings, in which.

Figure 1:
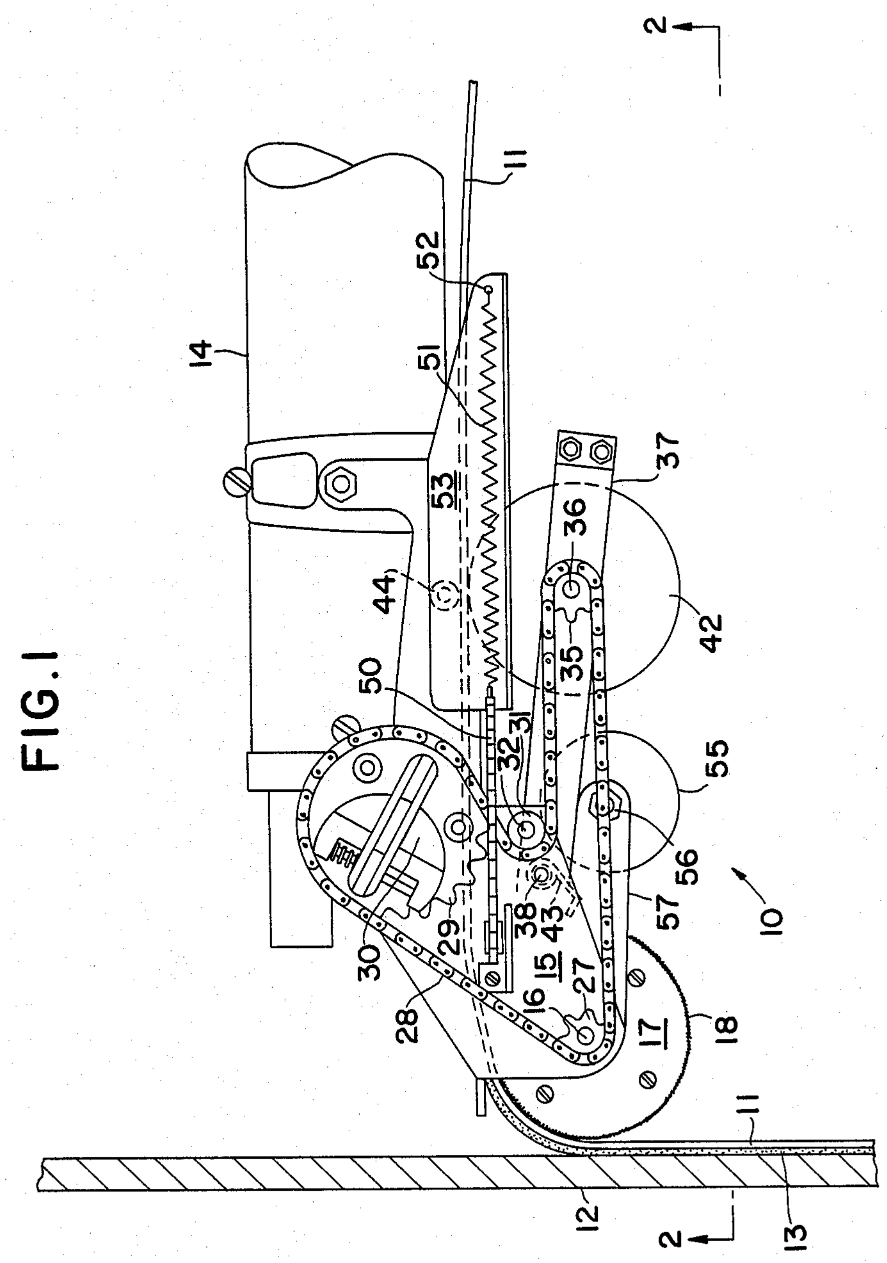
FIG. 1 is a view in side elevation of the forward end of the apparatus of the invention shown applying tape to a wall.

Referring now to the drawings, the apparatus is designated as a whole by the reference numeral 10 and is shown applying a tape 11 to a wall 12. A layer 13 of mastic or mud is applied to the inner surface of the tape and to the gap between wall sections.

The apparatus comprises a tubular body 14 which serves as a handle or grip and which holds a quantity of mastic. The interior of the body 14 is provided with a piston and means for actuating the piston to extrude the mastic and it is also provided with an outlet of a size and shape to extrude the mastic as the piston is moved forwardly (to the right as viewed in FIG. 1). These and other features of the device are not shown in the drawings of this application but are identical with those of U.S. Pat. No. 4,086,121, where they are shown and described in detail.

Figure 2:
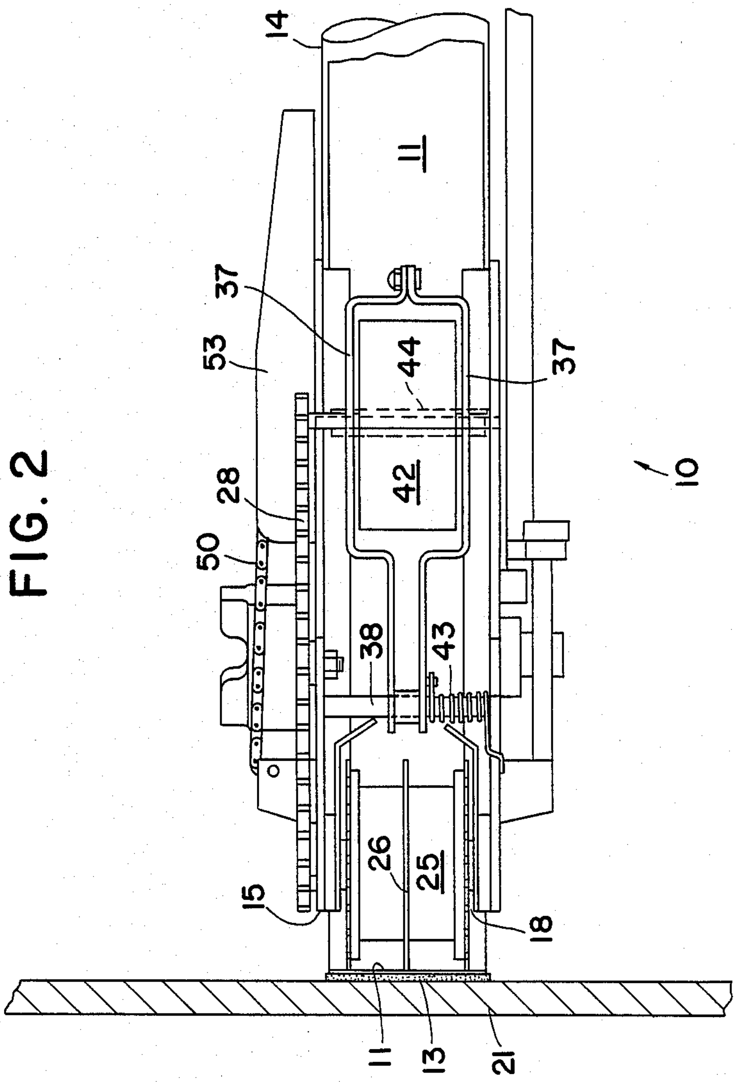
FIG. 2 is a view as seen above along the line 2—2 of FIG. 1, the creasing wheel referred to below and its mounting being removed to reveal more clearly other elements of the apparatus.

At its forward end the body 14 is fitted with a pair of spaced frame plates 15 which carry a shaft 16 extending between the plates. Drive wheels 17 having serrated rims 18 are mounted on shaft 16. It is the friction between the wheels 17 and the wall which serves as the motive force for the apparatus as it is moved along the wall. The shaft 16 also carries a hub 25 (see FIG. 2) on which a disc 26 is mounted which assists in pressing the tape against the wall.

A sprocket 27 is fixed to one end of the shaft 16 which, as it rotates with the wheels 17, drives a continuous chain 28. The chain 28 passes around a sprocket 29 on a clutch 30 whose function is described below. The chain then passes around an idler roller 31 mounted on a shaft 32 which in turn is mounted on a frame member. The roller 31 is adjusted to adjust the slack in the chain. Thence the chain passes around a sprocket 35 mounted on a shaft 36 which is carried by brackets 37 which are mounted on and fixed to a shaft 38 rotatably mounted in and between plates 15. Then the chain passes back to sprocket 27.

A tape feed roller 42 is provided which is rotatably mounted on shaft 36. The roller 42 is of rubber composition with a roughened surface. The shaft 38 has a coil spring 43 (see FIG. 2) coiled about it with one end fixed to a frame element and the other end fixed to the shaft 38. The coil spring 43 holds the tape feed roller 42 against a pinch roller 44 with the tape 11 between the two rollers. As the drive wheels 17 are moved up a wall 12 they rotate counterclockwise as viewed in FIG. 1, thus causing (by means of chain 28 and sprocket 29, roller 31 and sprocket 35) tape drive roller 43 to rotate counterclockwise as viewed in FIG. 1. This movement of tape feed roller 42 acts against pinch roller 44 to move the tape forwardly, or to the left as viewed in FIG. 1. It will be understood that the taper may be moved horizontally along a ceiling or a wall.

At the end of a stroke, i.e., when the tape reaches the ceiling, a sleeve (not shown) encasing housing 14 is pulled back and through a mechanical connection (also not shown) acts to pull chain 50 to the left (as viewed in FIG. 1) against the force of a spring 51, one end of which is attached to the chain 50, the other end being attached at 52 to a frame bracket 53. This pulls a blade (not shown) across the tape to cut it. These features and associated features are described in detail in U.S. Pat. No. 4,086,121. After the tape has been cut in this manner the aforesaid sleeve is returned to its original position. The taper then feeds tape forwardly with mastic on it at the commencement of the next stroke.

A creasing wheel or disc 55 is also provided which is rotatably mounted on a shaft 56 carried by brackets 57 which are mounted on shaft 16. By torsion means (not shown) the disc 55 is normally held in the inoperative position shown in FIG. 1. When it is desired to crease the tape at a corner, the disc 55 is pushed up manually to effect the desired creasing action.

The clutch 30 is mentioned above. It is part of a mechanism for forcing mastic through the body 14 by means of a piston, and this clutch is disengaged when the piston reaches a position at the end of its intended stroke thereby disconnecting the drive wheels 17 from the piston. The pertinent mechanism is described in U.S. Pat. No. 4,086,121 with reference to FIGS. 5, 6, 10 and 11 at Column 5, line 25 to Column 7, line 39 and at Column 12, lines 10 to 29, which are incorporated herein by reference.

It will therefore be apparent that a new and improved wall taping apparatus has been provided. Among other things, the apparatus is simpler to operate because it eliminates the tape advance stroke. Therefore the sleeve or control tube has a shorter stroke to cut the tape only. The apparatus of the invention advances the tape with mastic applied to it after each run and cut is made. It cuts the tape at the end of a stroke without leaving a length of tape to which no mastic is applied. Additionally the apparatus of the invention ensures that mastic is applied consistently from the very beginning of the new length of tape.

I claim:

1. In taping apparatus for applying tape and adhesive material or mastic to prefabricated wall sections whereby such adhesive is applied to the inner surface of the tape and to the joints between wall sections which are covered by the tape while the tape is being dispensed and applied to a wall, such apparatus comprising a rotary main drive roller engageable with a wall and which rotates by friction as it is moved along such wall, a tape drive roller for feeding tape forwardly, interconnecting means interconnecting the main drive roller with the tape drive roller to rotate the tape drive roller as the main drive roller is rotated, a pinch roller and means yieldably holding the tape drive roller against the pinch roller to cause feeding of the tape between the tape drive and pinch rollers, said apparatus also including a tubular body having a forward end and a rearward end, said main drive roller being mounted at the forward end of the tubular body and the tape drive roller being mounted on the tubular body rearwardly of the main drive roller, said tubular body serving to hold a supply of adhesive or mastic, said apparatus also comprising a sleeve slidable over said tubular body, and tape cutting means normally located in a non-cutting position but acting when said sleeve is moved rearwardly to sever the tape.

2. The taping apparatus of claim 1 wherein said interconnecting means is in the form of a first sprocket fixed to and coaxial with said main drive roller, a second sprocket fixed to and coaxial with said tape drive roller and a chain engaging said first and second sprockets and serving to drive the tape drive roller as the main drive roller is rotated.

* * * * *